United States Patent Office 3,407,804
Patented Oct. 29, 1968

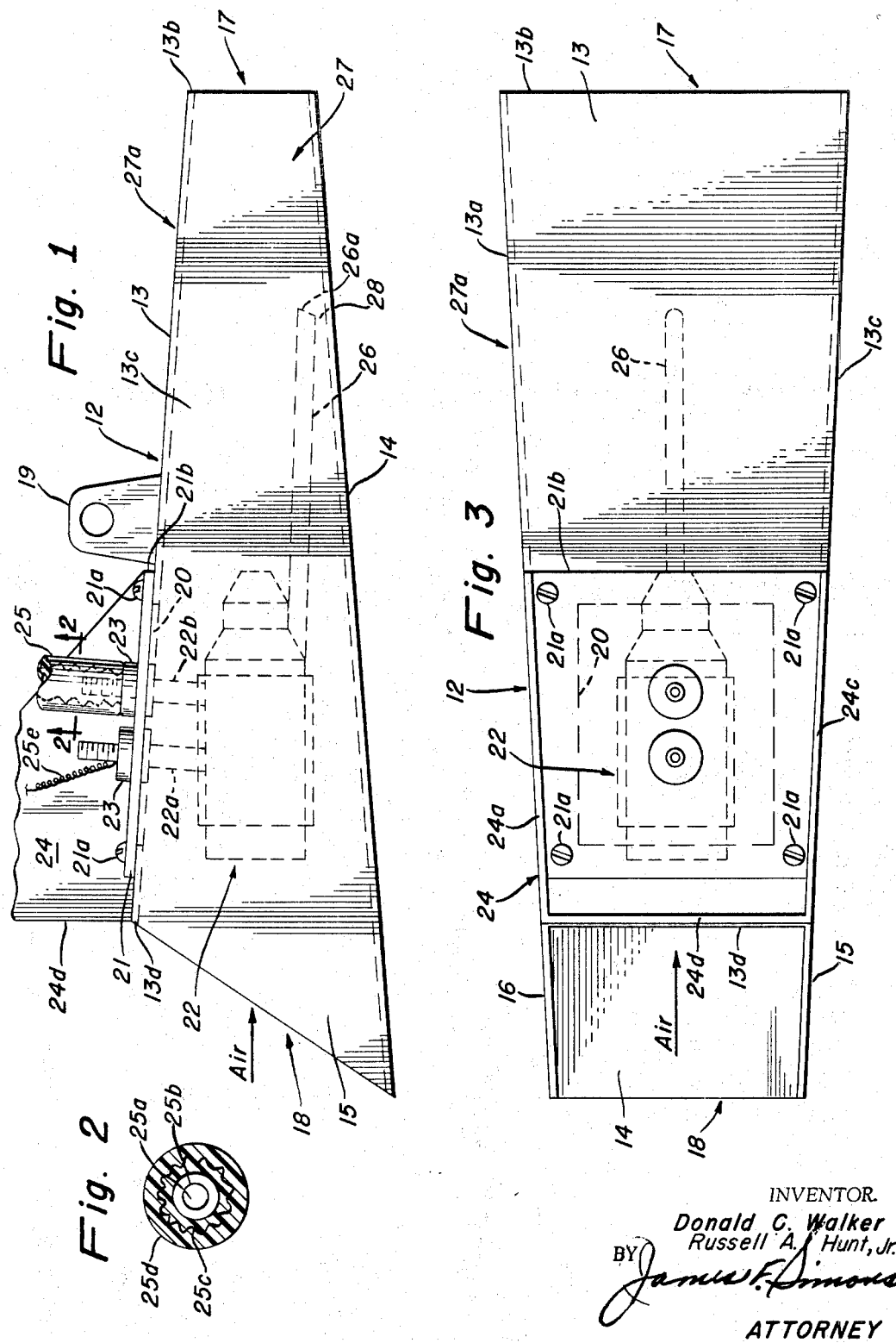

3,407,804
OIL BURNER FOR FLAME CULTIVATION
Donald C. Walker, Munster, and Russell A. Hunt, Jr., Griffith, Ind., assignors to Standard Oil Company, Chicago, Ill., a corporation of Indiana
Filed May 29, 1967, Ser. No. 642,065
7 Claims. (Cl. 126—271.2)

ABSTRACT OF THE DISCLOSURE

An improved oil burner for a flame cultivator having a shoe with a unitary valve and electrode disposed therein communicating with a source of supply of air and fuel through a pair of conduits. The improvement particularly relates to the integral construction of the valve and electrode so that the housing of the valve provides a conductor for the electrical charge passing through the valve and the integrally formed electrode to produce a spark for igniting a fuel.

Cross-reference to related applications

This is an improvement on the device disclosed and claimed in a patent application filed by Walker et al. on July 1, 1966, Ser. No. 562,313.

Background of the invention

This invention relates to improvements in apparatus for flame cultivation and more particularly to an oil fired burner for flame cultivation.

Flame cultivation is a relatively new agricultural technique for controlling weed growth by applying a flame in a controlled manner to remove weeds and other foreign heat sensitive matter from the crop field. Advantageously, flame cultivation obviates mechanical and chemical cultivation and the attendant hard pan, chemical residues, and soil sterilization problems while accomplishing almost immediate weed control. Additionally, a fuel oil burning flame cultivator provides a major advantage over the conventional LPG burner in that the cost of using No. 2 fuel oil is reduced about 50% or more over the LPG burner and the flame produced is colored and clearly visible.

Since the development of flame cultivation there has been an ever-continuing endeavor to produce apparatus and methods having increased simplicity of design throughout the entire body of the cultivator. Due to the nature of the use of an agricultural implement, simplicity, economy, stability, and ruggedness are all essential characteristics. Similarly, the burner assembly or the shoe forming a housing to provide a combustion bone in which an aspirating means and ignition means are located must be of simple, sturdy, foolproof construction yet provide a controlled flame for removing weeds and other foreign heat sensitive matter from the growing crop plants. Not only must this device satisfy the desirable characteristics necessarily inherent in the structure of any successful agricultural implement design, but this device must also meet the rigid standards of safety demanded in a device utilizing a flammable material producing an open flame. Accordingly, the burner means housing an aspirating means and an ignition means to produce a controlled flame must be heat and dirt resistant, sturdy enough to withstand continual vibrations, yet remain safe and dependable in operation.

The prior art exemplifies several approaches to the solutions of the myriad of problems involved in flame cultivation and the removal of other heat sensitive matter foreign to growing crops; however, it appears that none of the art anticipates nor renders obvious the instant simplified and novel apparatus defined and claimed herein.

Summary of the invention

This invention concerns improvements in apparatus utilized for flame cultivation. Specifically, this invention concerns improvements within the burner means, aspirating means, and ignition means for producing a controlled flame to remove weeds and other foreign heat sensitive matter from growing crops.

The improved novel oil fired flame cultivation apparatus of this invention comprises in combination burner means including a combustion chamber formed by a housing having an open forward end and an open rearward end, a plurality of conduit means each having an end positioned within the combustion chamber supplying fuel oil and air to the chamber, aspirating means positioned within the combustion zone and connected to the conduit means, said aspirating means having integrally formed thereon and extending forwardly therefrom an electrode, the electrode adapted to pass a spark from the forward end to a wall of the combustion zone so that the fuel will ignite as it is aspirated from the aspirating means to surrounding combustion zone. The improvements also include shield means at the top of the burner means for shielding the conduits from heat of extraneous origin and internally produced heat. The ignition means can either include conduit having a continuous conductor means therein or a conductor means extraneous of the conduit for supplying current through the aspirating means to the electrode.

Brief description of the drawing

A more complete understanding of the structural elements of the novel improvements defined and claimed herein will be augmented by reference to the attached drawing wherein:

FIG. 1 is an elevational view of the improved burner means;

FIG. 2 is a sectional view taken at line 2—2 of an embodiment of the conductor means integrally formed with the conduit means; and FIG. 3 is a plan view of the burner means.

Description of a preferred embodiment

Referring to FIG. 1, numeral 12 designates a burner means having a generally rectangular cross-section resembling a shoe formed by a top portion 13, a bottom portion 14, a first side portion 15, and a second side portion 16 (FIG. 3), to form a structure resembling a shoe having an open toe 17 and an open heel 18.

The top portion 13 has integrally mounted thereon support member 19 which is adapted to be attached to the frame of a flame cultivator not shown. Immediately to the rear of support member 19 in top portion 13 is opening 20 having first shield means 21 secured thereto by fastening means 21a. First shield means 21 is adapted to rigidly support aspirating means 22 by rigid conduit means 22a and 22b held in place by fastening means 23.

Top portion 13 having edges 13a, 13b, 13c, and 13d form a closed periphery wherein 13b has a greater length than 13d and 13a and 13c are essentially equal in length. Second shield means 24 includes a plate-like rear side 24d extending upwardly from edge 13d of top portion 13, the side 24d forming an essentially rectangular plate. The second shield means 24 also has essentially triangular side plates 24a and 24c which extend forwardly along the edges of body portion 13a and 13c respectively, and terminate immediately behind support member 19 at the forward edge 21b of the first shield means 21.

Ignition means include conduit 25 or conductor 25e, rigid conduit 22a or 22b, aspirating means 22, and electrode 26. FIG. 2 shows conduit 25 in cross-section taken at line 2—2 in FIG. 1 wherein the conduit has opening 25a, inner wall 25b and embedded conduit means 25c and outer wall 25d.

The combustion zone within the burner means is generally defined by the top portion 13, bottom portion 14, first side portion 15, and second side portion 16 having openings at the toe 17 and the heel 18. The first and second side portions 15 and 16 respectively are plate-like and taper toward the toe 17. The top portion and bottom portion are also plate-like; however, they taper toward the heel 18. Consequently, the depth of the shoe at the heel is greater than the depth of the shoe at the toe and the width of the shoe at the toe is greater than the width of the shoe at the heel.

In operation, oil under pressure within the range of about slightly above zero to about 15 p.s.i.g. is supplied from a source not shown to conduit 25, rigid conduit 22b and aspirating means 22. Air under pressure within the range of from about 15–60 p.s.i.g. from a source not shown is supplied through rigid conduit 22a to aspirating means 22 where the air is moved under pressure through the aspirating means and effects the flow of fuel from the aspirating means to cause the aspiration of the fuel within the combustion zone 27.

Simultaneously with the commencement of fuel aspiration in the combustion zone 27, ignition can manually or automatically be accomplished by means not shown. Ignition occurs when a charge from a source not shown is allowed to pass through conductor means 25c, FIG. 2, in conduit 25. Conduit 25 may be a flexible tubing for supplying either fuel or air to either of the rigid conduit means 22a or 22b. The electrical charge from a source not shown follows the conductor means 25c through conduit 25 and passes through either of the rigid conduits 22a or 22b into the aspirating means 22 and therefrom through electrode 26 which extends slightly outward and forward from aspirating means 22 toward the toe 17 of the combustion zone housing 27a within the combustion zone 27 to form a spark gap 28 between the forward terminus 26a of electrode 26 and the bottom portion 14 of the combustion zone housing.

When the electrical charge reaches the terminus 26a of electrode 26 the potential difference between terminus 26a and the ground, that is, bottom portion 14 of combustion zone housing 27a causes a spark to form and move across the spark gap 28 thereby igniting the aspirated fuel within the combustion zone 27. Bottom portion 14 serves as a ground because it is connected through the housing 27a and support member 19 to the frame of the cultivator not shown.

The novel improvements include the unitary integral structural combination of aspirating means 22 and electrode 26 as well as the rigid conduits 22a and 22b which may be employed in the alternative as conductor means depending upon which rigid conduit is electrically connected to the conductor means extending from the shoe to the extraneous source of the electrical charge not shown. The conductor means can be a wire 25e or other similarly satisfactory conductor means connected to rigid conduit 22a or 22b. The conductor means can also be located between the inner and outer walls 25b and 25d respectively of a flexible conduit 25 or other similarly suitable means for passing an electrical current to the terminus 26a of electrode 26.

First shield means 21 which can be made into the form of a plate from a material including an epoxy resin fiberglass laminate, silicone polymer and fiberglass laminate, ceramic materials, reinforced asbestos, or any other similarly suitable materials having the desirable characteristics including high thermal insulating properties, high electrical insulating properties, rigidity, stability, and low water absorption. The first shield means 21 must have the capacity to withstand temperatures of at least 600° F. to protect the upper ends of rigid conduits 22a and 22b as well as the flexible conduits such as 25 from the high temperatures existing within the combustion zone 27.

Furthermore, shield means 21 must be strong and rigid to support aspirating means 22 and to accommodate fastening means 21a and 23 and yet allow the simple and rapid removal, repair, and installation of these elements.

The second shield means 24 including the rear portion 24d and side portions 24a and 24c may be made of metal similar to that of the combustion zone housing or any other suitable material to function as a barrier to heat generated from sources exterior to the burner means such as from adjacent burners located at other points on the cultivator. Shield means 24 protects the rigid conduits 22a and 22b extending above top portion 13 and the flexible conduits such as 25 extending therefrom from the extraneous heat.

The combustion zone 27 formed by the combustion zone housing 27a resembling the shape of a shoe is in the preferred embodiment about 11½″ in the length of the bottom portion 14 and has a length of about 9½″ in the top portion 13. The width and height at the toe 17 is about 4″ and about 1½″ respectively, to form a rectangular cross-section. At the heel of the shoe a cross-section taken through edge 13d of top portion 13 perpendicular to the longitudinal axis has a width of about 3″ and a height of about 2½″. The first shield means 21 has a length of about 3½″ and is tapered rearwardly to substantially conform to the shape of that part of the periphery of top portion 13 to cover opening 20 which provides ready access to the unitary aspirating means 22 and electrode 26 located within combustion zone 27.

The open heel 18 of the combustion zone housing 27a provides the inlet for secondary air which is drawn into the combustion zone as a result of the Venturi effect produced by the combustion of the aspirated fuel within the combustion zone and through toe 17. The aspirating means 22 is strategically located with its forward end being approximately 5½″ from the toe and the integrally formed electrode 26 can be positioned about 1½″ from the toe 17. The spark gap between the terminus 26a of electrode 26 and the bottom portion 14 should be about ⅛″.

It should be understood that the electrode may be directed toward any of the interior sides of the combustion zone housing so long as a satisfactory spark gap is present and located between the aspirating means 22 and the toe 17. It should also be understood that the position of the aspirating means 22 within the combustion chamber can be varied to change the characteristic of the flame produced. It should be noted that the greater width of the combustion zone at the toe 17 of the combustion zone housing 27a provides a wide flame which gives an increased time increment during which the weeds and other foreign heat sensitive matter are subjected to the flame as the cultivator is in translational motion across a row-crop field.

The unitary construction of the aspirating means 22 and the electrode 26 provides many desirable features including simplicity, stability, and the ability to allow the aspirating means to serve in the additional capacty as a conductor of the electrical charge which produces a spark to ignite the aspirated fuel. An additional and very important feature in the unitary structure of the aspirating means of the electrode resides in the streamlining of these elements to permit a more desirable current flow of secondary air by the Venturi effect from the open heel 18 around the aspirating means 22 and electrode 26 with a minimum of obstruction. The prior art exhibits a separate electrode mounted in a ceramic or other suitable insulated base which occupies substantial space within the combustion zone and obstructs the passage of secondary air through the combustion zone and necessitates additional elements for removal, repair, and installation.

The invention is described by reference to the specific embodiment; however, it is understood that the embodiments are not intended to limit the scope of the invention, and they are presented only to teach the best modes contemplated for practicing this invention.

Having described the invention, what is claimed is:

1. In a burner for producing a controlled flame to remove weeds and other foreign heat sensitive matter in the flame cultivation of crops wherein a burner means having a combustion zone housing forming a configuration similar to a shoe with an open toe and an open heel, a pair of conduits extending into said shoe to supply air and fuel, an aspirating means connected to said conduits, and an ignition means including conductor means, said ignition means located in the combustion zone, the improvements comprising; said ignition means including an electrode integrally formed with the aspirating means, the electrode extending forward from the aspirating means and terminating in an end adapted to provide a spark gap between said end and the housing of the combustion zone.

2. The improved burner means of claim 1 wherein the spark gap is about 1/8".

3. The improved burner means of claim 1 wherein the conductor means includes the aspirating means and the pair of rigid conduits connected thereto.

4. The improved burner means of claim 1 wherein the conductor means include a flexible conduit connected to one of said conduits, said flexible conduit having an inner wall and an outer wall for supplying fuel or air to said aspirating means, said flexible conduit means having an electrical conductor located between its inner wall and its outer wall.

5. The improved burner means of claim 1 wherein a first shield means is located between said aspirating means and said conduits, said aspirating means being rigidly attached to said first shield means, said first shield means providing a heat shield between the combustion zone and the externally located conduit means and conductor means.

6. The improved burner means of claim 5 wherein a second shield means is located above the first shield means and extends upwardly and forwardly about the heel of said housing to shield the portions of the conduit means located externally of the combustion zone from heat of external origin.

7. The improved burner means of claim 1 wherein the conductor means is located externally of said conduit means.

References Cited

UNITED STATES PATENTS

| | | |
|---|---|---|
| 2,241,295 | 5/1941 | Clark. |
| 2,273,254 | 2/1942 | Davis _____ 126—271.2 |
| 2,904,032 | 9/1959 | Stanton _____ 126—271.2 |
| 3,263,729 | 8/1966 | Fetter et al. _____ 158—28 |

CHARLES J. MYHRE, *Primary Examiner.*